J. Perrins.
Jacquard Apparatus.
Nº 4,537.  Patented May 28, 1846.
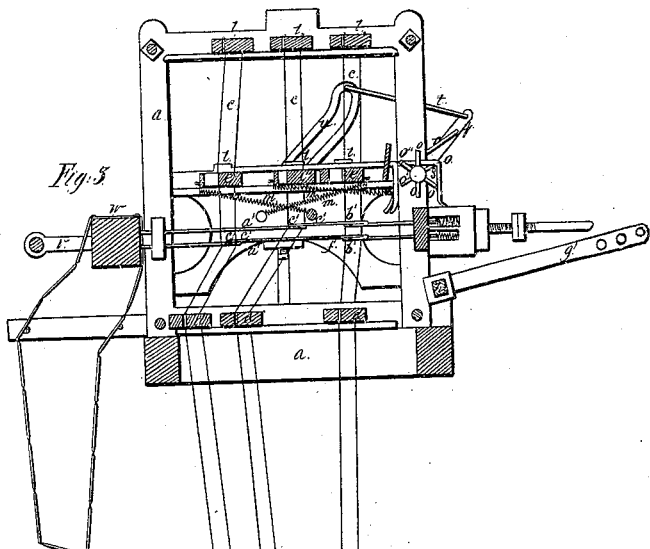
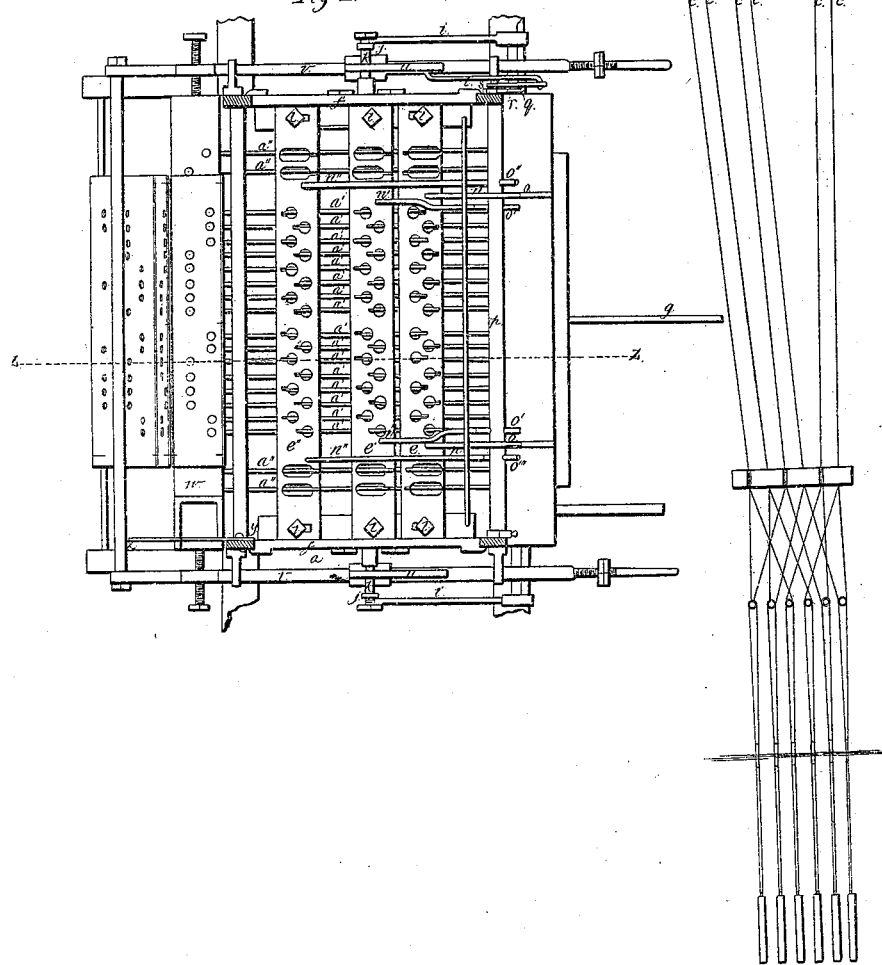

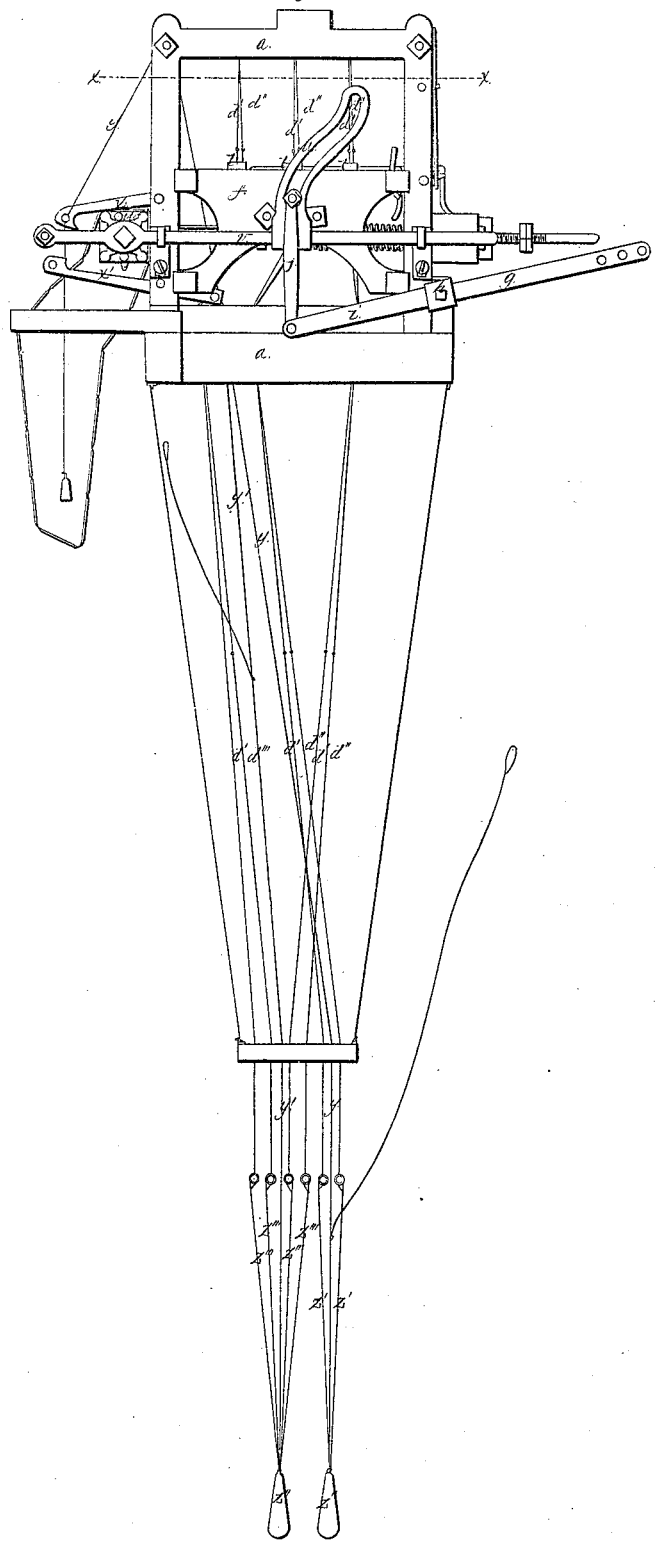

UNITED STATES PATENT OFFICE.

JOHN PERRINS, OF PHILADELPHIA, PENNSYLVANIA.

JACQUARD LOOM.

Specification of Letters Patent No. 4,537, dated May 28, 1846.

*To all whom it may concern:*

Be it known that I, JOHN PERRINS, of the city and county of Philadelphia and State of Pennsylvania, have invented new and useful Improvements in Jacquard - Frames for Weaving Three-Ply Carpets and other Figured Fabrics, and that the following is a full, clear, and exact description of the principle or character thereof which distinguishes my invention from all other things before known and of the manner of making, constructing, and using the same, reference being had to the accompanying drawings, making part of this specification, in which—

Figure 1 is a side elevation; Fig. 2, a horizontal section taken at the line X X of Fig. 1; and Fig. 3, a vertical section taken at the line Z Z of Fig. 2.

The same letters indicate like parts in all the figures.

In the jacquard frame as heretofore made and now used, the trap boards through which the tail cords pass and by which they are lifted, are each operated by separate levers, thus requiring as many levers and separate operations as there are trap boards; and in the mode of mounting to form the harness, as at present practised, each division of the tail cords (all that pass through one trap board, I will call a division) is in connection with one color only, (it will be understood that when I speak of one color, I mean all the threads connected with the mails of one pair of lifters) and that as a necessary consequence, when the threads of one color, (or combination of colors in a pair of lifters) are to be used to interweave the picks, the cards must be shifted, and a new card presented for each pick.

The object of my improvements is to simplify the structure and operation, first, by connecting all the trap boards, by horizontal slides with a vertically sliding frame operated by one single lever, so that all the trap boards are lifted together, the lifting of the tail cords being governed by the sliding of the trap boards, that are provided with notched holes through which the cords pass so that when the trap boards are shifted, (which is done by cams on a rotating shaft turned by the sliding of the trap board frame or any other intermitting movement) the knots on the tail cords which have been shifted by the needles are caught and lifted.

And secondly by connecting the tail cords that pass through one trap board with the mails on two different pairs of lifters, so that the mails of each lifter of one color, or one set of colors, are connected with two trap boards, and so of the other colors. The advantage of this arrangement is that one card only is required for each lash, as the interweaving of one color can be effected by one card in consequence of the connection of the mails of each lifter of one color each with two separate trap boards, while by the old plan it is necessary to shift the needles to interweave the same color, as the shifting of the threads of one color can only be done by shifting the needles by a change of cards, in consequence of the connection of all the mails of one color, or set of colors with one trap board.

In the accompanying drawings (*a*) represents the frame of the jacquard, and (*b, b, b*) the top tail boards to which the tail cords (*c, c, c*) are attached, and (*d, d, d*) the bottom tail boards through which these cords pass. The trap boards (*e, e′, e″*) slide horizontally on the top of a frame (*f*) that slides vertically on the four corner posts of the frame (*a*). This trap board frame (*f*) is operated by an arm or lever (*g*) on an arbor (*h*) each end of which is provided with an arm (*i*) connected with the frame (*f*) by joint links (*j, j*) and wrists (*k, k*) that project from the sides of the frame, so that by each down and up movement of the arm or lever (*g*) the trap board frame is lifted and depressed and with it the trap boards (*e, e′, e″*), which are connected with it by means of bolts (*l*) that pass through elongated holes in the ends of the boards and are tapped into the side pieces of the frame. The trap board (*e*) is drawn toward the middle of the machine by spiral (or other) springs (*m*), attached to the underside of the board and the frame (*f*), and the other two boards (*e′, e″*) are drawn toward the first in like manner by springs (*m, m*). And each trap board is provided with two arms (*n, n′, n″*), that extend back far enough to be acted upon by cams or tappets (*o, o′, o″*) on a shaft (*p*), there being one set of cams for each trap board, so that by the turning of the shaft (*p*) by an intermitting motion, the trap boards as they descend, are shifted in consequence of the arms (*n, n′, n″*) being brought in their appropriate turns into contact with the cams or tappets on the shaft (*p*). And the turning of this shaft (*p*) can be effected by the movement of any of the reciprocating parts of the machinery, although I prefer doing it by means of an arm (*q*), (that turns on the axis of the shaft), provided with a catch or hand (*r*) that takes into the teeth of a ratchet wheel (*s*) on the shaft, the arm (*q*) being connected by a joint link (*t*), with one of the curved grooved arms (*u, u*), by which the card cylinder is made to slide back and forth.

The curved groove of the arms (*u, u*) embrace the wrists (*k, k*) of the trap frame, so that as the trap frame moves up and down, the grooves being curved causes these arms to move back and forth, and as they are attached to the sliding rods (*v, v*) of the card cylinder (*w*), this (the cylinder) receives a back and forth movement from and toward the needles at each operation of the trap board frame. The journals of the card cylinder turn in boxes in the end of the sliding rods (*v, v*), and the cylinder is turned at the end of each lash, to shift the card, by being brought against a catch (*x*) which takes into a cog on the end of the cylinder. This catch is held up by a weight (*z*), attached to a card (*y*), during the picks that do not require the shifting of the card, but at the end of each lash it is dropped to turn the cylinder, and this is done by connecting the weight (*z*) with a pair of lifters by means of two cords (*z' z'*) so that when either of these lifters is lifted by one of the journal cords, the catch falls and is prepared to turn the cylinder when it slides back. When the pattern is completed the card must be run back which requires the cylinder to be turned in the opposite direction, this is effected by hitching up the catch (*x*), and liberating a corresponding catch (*x'*) below it which is carried up to be ready for action on the cylinder by a weight (*z''*) connected with the catch by means of a cord (*y'*), and with the other lifters by means of cords (*z'''*), so that while either of these lifters is up the catch is relieved of this weight, and stands clear of the cylinder, but at the end of each lash all of these lifters are down and then the catch is lifted up by the weight to turn the cylinder.

The needles (*a'*) are arranged with two or more rows, one above the other, with one end acted upon by springs in the usual manner, and the other presented to the action of the cards. The tail cords that pass through the trap board (*e*) pass through long eyes (*b'*) in the two sets of needles, and those that pass through the other two trap boards (*e', e''*) each pass through small eyes (*c'*) in one set of needles, and all the eyes are made relatively to the holes in the trap boards which are provided with notches, in the one (*e*) the reverse of those in the other two (*e', e''*). When all the needles are out, that is, when none of them are pushed in by the action of the card, the knots in all the tail cords are caught in the notches of the second and third trap boards, and not in the first, and pushing back one set of needles will liberate them in either the second or third, but to catch those in the first trap board both sets of needles must be pushed back, and it is for this purpose that the eyes through which the first set of cords pass are made long, otherwise a third set of needles would be required; and it will be evident that it is immaterial which one of the sets of tail cords passes through the long eyes. As the card is only shifted at the end of each lash and the journal cords must be shifted at the end of each pick, the journal cords (*d', d''*) pass through elongated holes in the trap boards so that by the sliding of these the appropriate journal cords are trapped and lifted without the necessity of shifting the journal needles (*a'' a''*) at the end of each pick, as by the old plan.

Instead of sliding the trap boards to catch or trap the tail cords as described above, they may be permanently attached to the vertically sliding frame and slides attached to or placed above or below them to trap or catch the tail cords substituted therefor. And instead of connecting the slides of the card cylinder with the trap board frame, they may be separate and work by separate means, so that the cylinder will have but one motion to the lash, while the trap frame will have one for each pick. In the event of this change the lever that operates the cams by which the trap boards are shifted should be connected with, and receive its motion from the trap frame instead of the slides of the card cylinder.

It will be evident from the foregoing that my improvement in the method of mounting the harness by connecting each division of the tail cords with two divisions of mails, or each division of mails with two divisions of tail cords can be advantageously employed without my improvement in the manner of operating the trap boards, although the two can be employed together more advantageously than either of them separately; but I do not wish to confine myself to the employment of both of them in combination.

I am aware that one division of mails carrying one color or set of colors have been connected with two trap boards, by having two sets of trap boards one above the other requiring separate and distinct movements to operate them, thus rendering the machinery more complex and expensive; and therefore I wish it to be distinctly understood, that I do not claim as my invention simply connecting one division of mails carrying one color, or set of colors; but What I do claim as my invention and desire to secure by Letters Patent is—

1. Connecting each division of mails with two divisions of tail cords, as herein described, whereby I am enabled to use but one card for each lash of any number of picks, as described.

2. And I also claim as my invention connecting by means of horizontal slides all the trap boards with one vertically sliding frame, as herein described, whereby all the trap boards are operated by one lever, as herein described.

JOHN PERRINS.

Witnesses:
WM. H. CHEETHAM, Jr.,
THOS. PERRINS.